J. J. LINEBAUGH.
CONTROL SYSTEM FOR ELECTRIC MOTORS.
APPLICATION FILED JULY 30, 1914.
1,250,906.
Patented Dec. 18, 1917.
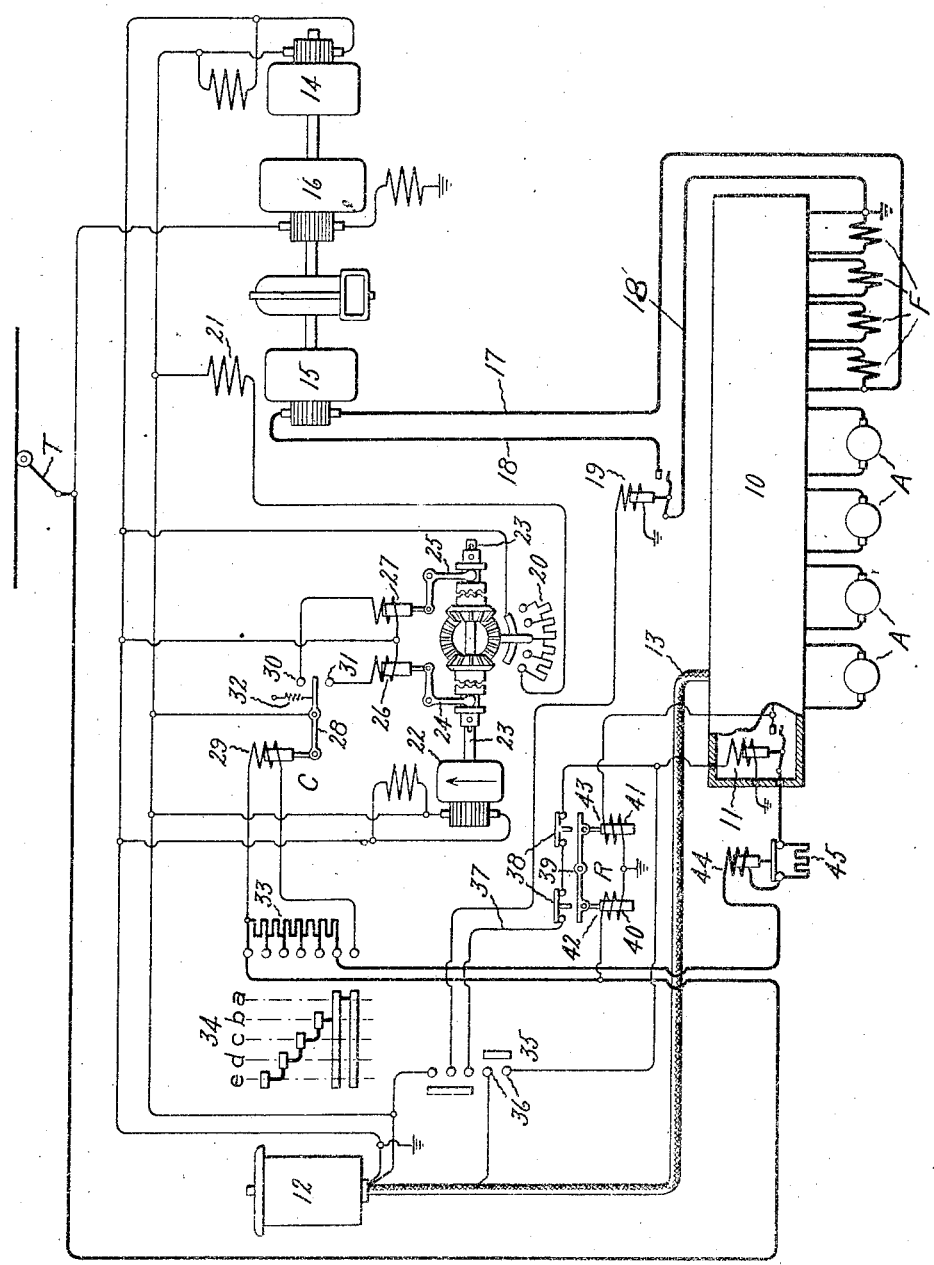
Witnesses:
Benjamin B. Hull
Arthur O. Ford
Inventor:
Jesse J. Linebaugh,
by Alfred Davis
His Attorney

UNITED STATES PATENT OFFICE.

JESSE J. LINEBAUGH, OF SCHENECTADY, NEW YORK, ASSIGNOR TO GENERAL ELECTRIC COMPANY, A CORPORATION OF NEW YORK.

CONTROL SYSTEM FOR ELECTRIC MOTORS.

1,250,906.  Specification of Letters Patent.  Patented Dec. 18, 1917.

Application filed July 30, 1914. Serial No. 854,074.

*To all whom it may concern:*

Be it known that I, JESSE J. LINEBAUGH, a citizen of the United States, residing at Schenectady, county of Schenectady, State of New York, have invented certain new and useful Improvements in Control Systems for Electric Motors, of which the following is a specification.

My invention relates to the control of electric motors and has for its object the provision of improved means whereby an electric motor may be started, stopped and generally controlled in a reliable, safe and efficient manner.

More specifically, my invention relates to the control of direct current motors, one of the objects being to provide improved means whereby an electric motor may be retarded by causing it to act as a generator to return energy to the line. While my invention may be of general application in the field of motor control, it is particularly applicable to electric traction systems. In the operation of trains on heavy grades, one of the great problems is the braking of the train. In some instances on long grades, brake shoes will be worn out or destroyed in a single trip. The wear on the rails is also a matter of serious consideration. Furthermore, trouble is oftentimes caused by the overheating which results from the braking. It has heretofore been proposed to brake electrically operated trains at least in part by causing the motors to act as generators and return energy to the line. This form of braking is commonly known as "regenerative" braking. One of the difficulties, however, with using the system in electric traction is that series motors are used almost universally in traction work and the characteristics of the series motors are not satisfactory for regenerative braking because of the well known variable field excitation. In order to overcome this difficulty, it has heretofore been proposed to superimpose a shunt characteristic upon the field of the series motor during braking operation, so as to give approximately a constant or shunt field excitation. This, in a broad sense, is a satisfactory solution, but there still remain practical difficulties to be overcome, one of the principal of which is the keeping of the current within safe limits due to variations of trolley voltage during the braking operation and at the same time have the braking effort entirely under the control of the operator. One of the objects of my invention is to provide means whereby the operator may obtain the desired degree of braking without danger to the motors or other apparatus due to excessive current. The trolley or line voltage of traction systems generally varies over a considerable range, but on a direct current regenerative system this variation is very pronounced at times because of the effect which the locomotives or trains have upon the voltage.

In carrying out my invention I provide the necessary source of variable potential for imposing a controllable excitation upon the series motors by a suitable source of power, such as a motor generator. The motor of the motor generator is connected to operate on line potential, and the generator, which may be called the exciter, is connected across the fields of the motors, to give them a stable characteristic. The field of the exciter is separately excited from an auxiliary generator which may be used also for supplying the necessary low voltage for the control circuit, lighting circuits, etc. Both the generator and the exciter may be driven by the same motor. The voltage of the exciter is varied so as to vary the excitation of the fields of the traction motors by an automatic regulator under the control of a contact making ammeter. One satisfactory means for accomplishing this automatic variation is by means of a motor operated rheostat which varies the resistance in the exciter field, the operation of which is controlled by a contact-making ammeter in the regenerative braking circuit. By this arrangement, if the braking current starts to rise above a safe or desired value, the regulator will operate to insert resistance in the field of the exciter and thereby lower the voltage impressed on the motor fields, the effect of which will be to lower the armature voltage and thereby the braking current, or if the current is too low, the regulator will operate to cut out resistance and increase the braking current. The braking current will thus be kept practically constant at the desired value regardless of variations of voltage, changes of grade and train friction. Furthermore, the saving of power effected by this regenerative system is very important. From ten to fifteen per cent. saving of power is quite common, and under some special conditions there will be a much greater saving. Means are also provided whereby the braking circuit cannot be closed if there is any considerable difference between the line voltage and the voltage of the motors acting as generators. This will prevent the too sudden application of a large braking effort which would jar the train and perhaps cause other damage. Means are also provided whereby the operator may vary the braking effort at will and he therefore always knows just what braking effort he will get when he throws to braking position. In other words, the braking is entirely within his control and there is no possibility of getting excessive currents due to abnormal variations of voltage or other causes. Other objects and features of my invention will appear in the course of the following specification, in which I have shown my invention embodied in concrete form for purposes of illustration.

My invention will be more readily understood by referring to the accompanying drawings, in which I have shown diagrammatically a motor control system embodying my improvements.

Referring to the drawing, it will be seen that I have shown my invention in connection with an electric traction system which may be used either on a locomotive or on a multiple unit system of control. In this particular case the system is intended for a locomotive having four motors controlled by series parallel control. Since my invention is in no wise limited in its application to any particular form of motor control, I have merely shown motoring connections diagrammatically without any attempt to illustrate the detail connections involved in the various steps of the control. The fields F of the four motors are connected on the ground side of the armatures A and the motors are caused to assume the various connections involved in series-parallel control by means of contactors located in the contactor box 10, which box is broken away to show one of the contactors, a line contactor, 11. These contactors are controlled in the well known manner by the master controller 12, the control circuits for the contactors being carried in the cable 13. Since the voltage on which a system of this character would ordinarily be used is high, the control circuit for the motors is supplied from the generator 14. This generator may supply any other low voltage circuits required in addition to the control circuit.

In order to superimpose a suitable potential upon the series fields F of the motors for regenerative braking, I provide an exciting generator 15 driven by a series motor 16 connected to trolley T. This motor 16 in the present instance also drives the auxiliary generator 14, as well as a blower for cooling the motors, although of course it will be perfectly feasible to have the various parts driven by other motors if desired. The armature of the exciter 15 is connected across the fields F of the motors through the wires 17, 18 and 18', this circuit being controlled by the contactor 19. In order to vary the excitation imposed upon the fields F, the exciter 15 has a separately excited field which, in this case, is supplied from the auxiliary generator 14. The potential of the exciter is controlled by varying the resistance 20 in the exciter field 21. This resistance 20 in the field of the exciter is controlled automatically by the motor current during regenerative braking. There are various ways of accomplishing this automatic control but a very effective arrangement is shown in the drawings consisting of an automatic regulator in the form of a motor-operated rheostat which includes the resistance 20. This motor-operated rheostat comprises a small shunt motor 22 supplied with voltage from the generator 14. This motor is constantly operating, but will drive nothing but the shaft 23 unless one of the clutches 24 or 25 is thrown in. If the clutch 24 is thrown in, the rheostat arm will be operated to cut in resistance, whereas if the clutch 25 is thrown in the rheostat arm will be operated to cut out resistance in the exciter field circuit 21. These clutches I have shown as being electrically operated by means of solenoids 26 and 27 respectively, the circuits of which are controlled by a contact making ammeter C which is diagrammatically illustrated as consisting of a pivoted arm 28 operated by a solenoid 29 arranged to move between contacts 30 and 31, the arrangement being such that when the arm engages the contact 30, solenoid 27 will be energized from the generator 14, and when the contact 31 is engaged the solenoid 26 will be similarly energized. As shown, the arm 28 is moved in one direction by the spring 32 which acts in opposition to the solenoid 29. And this solenoid is energized in proportion to the current during regenerative braking, and to this end is connected across the resistance 33, more or less of which is placed in circuit by the braking controller 34 during regenerative braking.

A switch 35 is provided for changing the connection from motoring to braking. The motoring connection established by this switch simply consists of bridging the contacts 36 which closes the line contactor 11 and completes the motor circuit. When the switch is thrown to the braking position two things are done: first, the contactor 19 is closed which connects the exciter 15 across the field coils F; second, the line contactor 11 is energized in part through a different circuit than it was on the motor side. It is now energized through wire 37 and contacts 38. These contacts 38 form part of differential voltage relay R which is responsive to the ratio of the trolley voltage and the voltage generated by the traction motors acting as generators and prevents the braking circuit from being established while there is any marked difference between the trolley and the regenerated voltage. It consists of a pivoted arm 39 which is balanced by two cores 40 and 41 of two solenoids 42 and 43 respectively. Solenoid 42 is energized in proportion to line voltage, while the solenoid 41 is energized in proportion to the regenerated voltage. The arrangement is such that any marked difference between the line and the regenerated voltage will cause an unbalancing which will prevent the closing of the contacts 38 and consequently prevent the closing of the circuit of the energizing coil of line contactor 11. An overload relay 44 is also provided which normally short circuits a resistance 45. Any excessive current, such for instance as that due to a short circuit, will cause the relay 44 to be operated and the resistance 45 to be inserted in the motor circuit.

As thus constructed and arranged, the operation of my system is as follows: During normal motoring operation the switch 35 will be thrown to the motoring position and the motors will be controlled in the well understood manner from the master controller 12 to bring about the various series-parallel positions. If now the train should be descending a grade and it is desired to commence the regenerative braking, the switch 35 will be thrown to braking position whereupon the contactor 19 will be closed and hence the armature of the generator 15 will be connected across the fields F and the voltage of said generator impressed upon said fields to excite them in the same direction as during the motoring operation. When the voltage developed by the motors acting as generators, becomes substantially equal to line voltage the pivoted arm 39 of the relay R will assume the position illustrated and the operating circuit of the line contactor 11 will be closed through the contacts 38 and hence line contactor 11 will be closed. The motors will then act regeneratively and deliver current to the supply line. It may be remarked that, during the regenerating operation, the regenerated current and the exciting current for the fields F both traverse a circuit comprising the conductor 18', contactor 19, conductor 18, the armature of generator 15, and conductor 17 and that the regenerated current is delivered to a circuit which conveys it to the trolley T. It is understood that the master controller has been placed in an operating position, so that the motor armatures are connected in series, series-parallel, or parallel before the switch 35 was thrown to its braking position. If it is later desirable to change the connections of the motor armatures to vary the speed at which the train shall be allowed to move, then this can be effected by further operation of the master controller 12. The current during braking is automatically controlled by the automatic regulator, the operation of which is controlled by the contact making ammeter, and the setting of the contact making ammeter is in turn determined by the position of the braking controller 34. As previously explained, the contact making ammeter in the system illustrated in the drawing is responsive to variations in the regenerative braking current, so that if the current should start to rise above a safe value due to drop in trolley voltage or increase in grade or decrease of train friction the motor operated rheostat will operate in a manner heretofore described to insert resistance 20 in the field of the generator 15 and decrease the excitation superimposed on the fields F of the motors and thereby cause the motors which are now acting as generators to drop a part of their load and decrease the current. In a similar manner the excitation of the series motors will be increased by cutting out the resistance 20 from the field circuit of the exciter 15 when the motor current drops below the desired value. Various values of braking current and hence various braking efforts may be obtained by operating the braking controller 34 which taps more or less of the resistance 33. Since the contact making ammeter is set to balance at a definite voltage, a larger current in the resistance or current shunt 33 will be required to give a corresponding drop to operate it when part of the resistance is short circuited, and the current will therefore be held constant at this higher value. Various braking efforts may therefore be obtained by manipulating the braking controller 34 and the current will automatically be kept approximately constant at the values corresponding with these braking efforts.

It will be seen that since the motor 22 is constantly operating, any sudden change of current caused by the fluctuation of the trolley voltage or change of grade will instantly affect the motor operated rheostat. Hence the excitation imposed upon the series field will be affected to bring the current back to normal. I thus make it possible to obtain practically constant braking effort at various grades and in spite of sudden variations in voltage, this being done automatically without any attention whatever from the operator. Any desired braking effort may be obtained by manipulating the braking controller 34 and the current which causes this braking effort will be maintained practically constant within normal field limits so that the operator always knows just what the braking effort will be when he throws his switch to the braking position. By this arrangement it is impossible to overload the motors and otherwise damage the apparatus due to excessive current. Not only does this provide an exceedingly effective and powerful brake upon the train which is easily controlled, but a very substantial saving of energy is effected by returning it to the line. While this method of braking would not ordinarily be employed without the usual mechanical brakes, it nevertheless makes it unnecessary to use the mechanical brake equipment to such an extent as to wear it out so rapidly as heretofore, and a much evener and more effective braking effect is obtained at less expense.

It has also been found that the track wear is much less with electric braking than with air brakes with a very great saving in track maintenance.

While I have described my invention as embodied in concrete form and as operating in a specific manner in accordance with the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In combination, a dynamo-electric machine provided with an armature and a field winding and adapted to operate either as a motor or as a generator, a circuit, including a source of voltage which is independent of such dynamo-electric machine, adapted during the generator operation to be connected to said field winding to supply exciting current thereto and to carry both the exciting current and the current generated by said dynamo-electric machine, a circuit adapted to carry only the current generated by said dynamo-electric machine and automatic means for maintaining the current in one of said circuits substantially constant.

2. In combination, a dynamo-electric machine provided with an armature and a field winding and adapted to operate either as a motor or as a generator, a circuit, including an exciter, adapted during the generator operation to be connected to said field winding to supply exciting current thereto and to carry both the exciting current and the current generated by said dynamo-electric machine, a circuit adapted to carry only current generated by said dynamo-electric machine, and automatic means for varying the voltage of said exciter and thereby maintaining the current in one of said circuits substantially constant.

3. In combination, a dynamo electric machine having a field winding connected in series with its armature, means for giving various definite values of current when said dynamo electric machine is driven as a generator, and means whereby the regenerative current is kept substantially constant at any of said values regardless of voltage fluctuations.

4. In combination, a dynamo electric machine having a field winding connected in series with its armature, means for giving various definite values of current when said dynamo electric machine is driven as a generator, means whereby the regenerative current is kept substantially constant at any of said values regardless of voltage fluctuations, and means whereby the circuit of said dynamo electric machine can only be closed when there is no substantial difference between the line voltage and the voltage of the dynamo electric machine acting as a generator.

5. In combination, a dynamo electric machine having a field winding connected in series with its armature, a separately controllable source of potential connected across said series field, and automatic means for controlling the potential supplied by said source arranged to hold the current generated by said dynamo electric machine constant when the latter is driven as a generator.

6. In combination, a dynamo electric machine having a field winding connected in series with its armature, a separately controllable source of potential connected across said series field, a power operated rheostat for controlling the potential supplied by said source, and automatic means for controlling said rheostat arranged to hold the current generated by said dynamo electric machine constant when the latter is driven as a generator.

7. In combination, a dynamo electric machine having a field winding connected in series with its armature, a separately controllable source of potential connected across said series field, a power operated rheostat for controlling the potential supplied by said source, and a contact-making ammeter responsive to the current generated by said series wound dynamo electric machine when the latter is driven as a generator, for controlling the extent and direction of movement of said rheostat.

8. In combination, a dynamo electric machine having a field winding connected in series with its armature, a separately controllable source of potential connected across said series field, a power operated rheostat for controlling the potential supplied by said source, a resistance in series with said dynamo electric machine, and a contact-making ammeter in shunt with said resistance for controlling the extent and direction of movement of said rheostat when said dynamo electric machine is driven as a generator.

9. In combination, a dynamo electric machine having a field winding connected in series with its armature, a separately controllable source of potential connected across said series field, a power operated rheostat for controlling the potential supplied by said source, an adjustable resistance in series with said dynamo electric machine, means for adjusting said resistance, and a contact-making ammeter in shunt with said resistance for controlling the extent and direction of movement of said rheostat when said dynamo electric machine is driven as a generator.

10. In combination, a dynamo electric machine having a field winding connected in series with its armature, a separately excited dynamo electric machine connected across said series field winding, means for driving the latter machine as a generator, means for varying its excitation, and automatic means for controlling said last mentioned means arranged to hold the current generated by said series wound dynamo electric machine constant when the latter is driven as a generator.

11. In combination, a dynamo electric machine having a field winding connected in series with its armature, a separately excited dynamo electric machine connected across said series field winding, means for driving the latter machine as a generator, means for varying its excitation comprising a power operated rheostat, and automatic means for controlling said last mentioned means arranged to hold the current generated by said series wound dynamo electric machine constant when the latter is driven as a generator.

12. In combination, a series dynamo-electric machine, an exciter, means for connecting the armature of said exciter across the series field winding of said dynamo-electric machine, an automatic regulator for controlling the excitation of said exciter, and a braking controller controlling the operation of said automatic regulator.

13. In combination, a series dynamo-electric machine, an exciter, means for connecting the armature of said exciter across the series field winding of said dynamo-electric machine, a regulator for the excitation of said exciter, a contact-making ammeter controlling the operation of said regulator, and a braking controller controlling the setting of said contact making ammeter.

14. In combination, a series dynamo-electric machine connected to a power circuit, an exciter, means for connecting the armature of said exciter across the series field winding of said dynamo-electric machine, a regulator for controlling the excitation of said exciter, a contact-making ammeter controlling the operation of said regulator, and a braking controller controlling the setting of said contact making ammeter.

15. In combination, a series dynamo-electric machine connected to a power circuit, an exciter, means for connecting the armature of said exciter across the series field winding of said dynamo-electric machine, an automatic regulator for controlling the excitation of said exciter, and a braking controller controlling the operation of said automatic regulator.

In witness whereof, I have hereunto set my hand this 29th day of July, 1914.

JESSE J. LINEBAUGH.

Witnesses:
BENJAMIN B. HULL,
HELEN ORFORD.